(12) United States Patent
Zhang et al.

(10) Patent No.: US 11,547,097 B2
(45) Date of Patent: Jan. 10, 2023

(54) **HYBRIDIZATION METHOD OF *SINOCYCLOCHEILUS GRAHAMI* AND CARP**

(71) Applicant: Kunming Institute of Zoology, Chinese Academy of Sciences, Yunnan Province (CN)

(72) Inventors: Yuanwei Zhang, Yunnan Province (CN); Xiao'ai Wang, Yunnan Province (CN); Xiaofu Pan, Yunnan Province (CN); Junxing Yang, Yunnan Province (CN)

(73) Assignee: KUNMING INSTITUTE OF ZOOLOGY, CHINESE ACADEMY OF SCIENCES, Yunnan Province (CN)

( * ) Notice: Subject to any disclaimer, the term of this patent is extended or adjusted under 35 U.S.C. 154(b) by 37 days.

(21) Appl. No.: 17/204,302

(22) Filed: Mar. 17, 2021

(65) Prior Publication Data

US 2022/0174915 A1 Jun. 9, 2022

(30) Foreign Application Priority Data

Dec. 4, 2020 (CN) .......................... 202011410270.1

(51) Int. Cl.
 *A01K 61/17* (2017.01)
(52) U.S. Cl.
 CPC .................................... *A01K 61/17* (2017.01)
(58) Field of Classification Search
 CPC ......... A01K 61/10; A01K 61/17; A01K 61/80
 USPC ................. 119/215, 217–218, 228, 230–231
 See application file for complete search history.

(56) References Cited

U.S. PATENT DOCUMENTS

| | | | | |
|---|---|---|---|---|
| 3,916,832 A * | 11/1975 | Sweeney | ................. | A01K 61/10 119/212 |
| 5,048,458 A * | 9/1991 | Ebner | .................... | A01K 61/17 119/217 |
| 5,660,142 A * | 8/1997 | Van Rijn | ................... | C02F 3/30 119/228 |
| 6,463,882 B1 * | 10/2002 | Harris, Jr. | .............. | A01K 61/10 119/230 |
| 6,564,747 B2 * | 5/2003 | Harris, Jr. | .............. | A23K 50/80 435/375 |
| 8,651,058 B1 * | 2/2014 | Pierce | .................... | A01K 63/00 119/215 |
| 2011/0315086 A1 * | 12/2011 | Kim | ..................... | A01K 63/065 119/225 |

FOREIGN PATENT DOCUMENTS

CN 108901941 * 11/2018

\* cited by examiner

*Primary Examiner* — David J Parsley
(74) *Attorney, Agent, or Firm* — Tarolli, Sundheim, Covell & Tummino LLP

(57) ABSTRACT

A hybridization method of *Sinocyclocheilus grahami* and carp, which comprises parent fish cultivation, artificial insemination, fish egg incubating and fry feeding, strictly controls environmental parameters and feed types of parent fish cultivation, simulates good living conditions for *S. grahami* and carp, is beneficial for wild *S. grahami* and carp to adapt to the artificial breeding environment quickly, realizes natural spermatogenesis and oviposition in artificial environment without using the oxytocin, and provides sperm and eggs both in quality and quantity for artificial hybridization. At the same time, the key parameters during incubation (including incubating water level, water temperature, water flow velocity, pH, dissolved oxygen and sterilization of fertilized eggs, etc.) are also defined to provide suitable environmental conditions for the successful incubation of fertilized eggs.

11 Claims, No Drawings

HYBRIDIZATION METHOD OF *SINOCYCLOCHEILUS GRAHAMI* AND CARP

CROSS REFERENCE TO RELATED APPLICATION

This application claims the priority of Chinese Patent Application NO. 202011410270.1, entitled "hybridization method of *Sinocyclocheilus grahami* and carp" filed with China National Intellectual Property Administration on Dec. 4, 2020, which is incorporated herein by reference in its entirety.

TECHNICAL FIELD

The present disclosure belongs to the technical field of aquaculture, especially relating to a hybridization method of *Sinocyclocheilus grahami* and carp.

BACKGROUND ART

*Sinocyclocheilus grahami* belongs to Cypriniforms, Cyprinidae, Barbinae and *Sinocyclocheilus*, also known as the golden thread fish. The *S. grahami* has the characteristics of tender meat and delicious taste, and has the efficiency of nourishing yin and regulating vital energy, warming kidney and replenishing essence. Its value has long been recorded in "Da Ming Yi Tong Zhi" and has a long-standing reputation. The *S. grahami*, together with *Cyprinus pellegrini*, *Schizothorax taliensis* and *Anabarilius grahami*, are listed as "the four famous fishes in Yunnan", and the *S. grahami* tops the list. *S. grahami* is rich in DHA, which is 7 times that of grass carp and 2.4 times that of crucian carp, and has the highest DHA among freshwater fish.

Carp is a common aquaculture fish, which is widely cultivated in various types of water because of its high adaptability to the environment. However, the fish quality of carp is far less than that of *S. grahami*, while the growth speed and tolerance to the environment of *S. grahami* are not as good as those of carp.

Compared with terrestrial animals, the breeding history of fish is very short. Although the selective breeding of ornamental fish has a long history in China, it was not until 1970s that scientific and systematic research on genetic breeding began to follow the genetic breeding of terrestrial domestic animals. With the continuous development and innovation of modern genetics and biotechnology, a series of breeding techniques, including selective breeding, cross breeding, gynogenesis, sex control breeding, polyploid breeding, whole genome selective breeding, etc., have been established and applied to fish genetic breeding practice. By 2018, 102 new national fish varieties developed by genetic breeding technology in China have been approved, including 46 hybrids, accounting for 45% of the total.

Hybridization is an effective method to prevent degradation of varieties and create excellent varieties, which can be divided into close hybridization and distant hybridization. Close hybridization refers to the hybridization between individuals of different strains and varieties within the same species, and distant hybridization refers to the hybridization between two species whose genetic relationship is between or above species, which can combine the genomes of different species together, and make the hybrid offspring significantly change in phenotype and genotype. Among 46 new hybrid fish varieties, most of them are close hybridization, and the interspecific distant hybridization mainly occurs in *Carassius, Cyprinus, Channa* and *Siniperca*. The cross-genus distant hybridization include carp-crucian hybridization and megalobrama amblycephala-culter alburnus hybridization, and the cross-subfamily distant hybridization is more rare, with only one kind of bream hybrid fish, which is a hybridization between culterinae and xenocyprininae. Compared with the other subfamily, the genetic relationship between culterinae and xenocyprininae is relatively close, so the hybridizing difficulty between the two species is high, and there is no research report on the hybridbreeding of the barbinae (*Sinocyclocheilus*) and the cyprininae (*Cyprinus*) with a relatively distant relationship.

SUMMARY OF THE INVENTION

In view of this, the purpose of the present disclosure is to provide a hybridization method of *Sinocyclocheilus grahami* and carp, and cultivate a new hybrid variety, which has better meat quality than carp, faster growth speed than *S. grahami* and higher yield in high-grade freshwater aquaculture.

The present disclosure provides a hybridization method of *S. grahami* and carp, comprising the following steps:

placing the *S. grahami* and carp in culture ponds respectively for parent fish culture;

the environmental parameters of *S. grahami* parent fish culture are as follows: water temperature is 15-22° C., water flow velocity is 5-20 cm/s, dissolved oxygen of water is 6.0-8.5 mg/L, water pH is 7.0-7.6; the environmental parameters of carp parent fish culture are as follows: photoperiod is 9-12 h, water temperature is 16-25° C., water flow velocity is 25-50 m/min, water transparency is 90-95 cm, dissolved oxygen of water is 6.5-8.5 mg/L, water pH is 6.8-7.2;

during the parent fish culture of *S. grahami* and carp, feeding pellet feed twice a day;

collecting sperm and eggs from male and female *S. grahami* parent fish and carp parent fish with mature gonads respectively, artificially inseminating and incubating;

after feeding the incubated fry, obtaining the hybrid variety of *S. grahami* and carp.

In some embodiments, the environmental parameters of parent fish culture of *S. grahami* are rhythmically regulated:

in Stage 1 (4 months): water temperature is 15-20° C., water flow velocity is 10-20 cm/s, dissolved oxygen of water is 7.0-8.0 mg/L, and water pH is 7.0-7.6;

in Stage 2 (4 months): water temperature is 18-22° C., water flow velocity is 5-15 cm/s, dissolved oxygen of water is 7.0-8.5 mg/L, and water pH is 7.2-7.4;

in Stage 3 (4 months): water temperature is 15-20° C., water flow velocity is 5-15 cm/s, dissolved oxygen of water is 6.0-7.0 mg/L, and water pH is 7.0-7.6.

In some embodiments, the environmental parameters of parent fish culture of carp are rhythmically regulated:

in Stage 1' (5 months): photoperiod is 9-10 h, water temperature is 16-20° C., water flow velocity is 30-50 m/min, transparency of water quality is 90-95 cm, dissolved oxygen of water is 6.5-7.5 mg/L, and water pH is 6.8-7.2;

in Stage 2' (4 months): photoperiod is 11-12 h, water temperature is 18-25° C., water flow velocity is 25-40 m/min, water transparency is 90-95 cm, dissolved oxygen of water is 7.0-8.5 mg/L, and water pH is 7.0-7.2;

in Stage 3' (3 months): photoperiod is 11-12 h, water temperature is 18-25° C., water flow velocity is 40-45 m/min, transparency of water quality is 90-95 cm, dissolved oxygen of water is 7.0-7.5 mg/L, and water pH is 6.8-7.2.

In some embodiments, during the parent fish culture of *S. grahami* and carp, the pellet feed is rhythmically regulated according to requirements:

feeding feed SGF1 in Stage 1 or Stage 1', wherein the feed SGF1 is a mixture of mash feed containing 30% crude protein, shrimp, vitamin D3 calcium tablets, multi-vitamin tablets and water, with a mass ratio of 250:20:10:8:300;

feeding feed SGF2 in Stage 2 or Stage 2', wherein the feed SGF2 is a mixture of mash feed containing 35% crude protein, vitamin D3 calcium tablets, multi-vitamin tablets and water, with a mass ratio of 280:20:10:300;

feeding feed SGF3 in Stage 3 or Stage 3', wherein the feed SGF3 is a mixture of mash feed containing 32% crude protein, vitamin D3 calcium tablets, vitamin C and water, with a mass ratio of 250:20:20:300.

In some embodiments, the artificial insemination comprises *S. grahami* as female parent×carp as male parent and *S. grahami* as male parent×carp as female parent.

In some embodiments, the quantity ratio of eggs to sperms is $1-3:1-10\times10^5$ during the artificial insemination.

In some embodiments, the incubating parameters of the incubating pond are as follows: water level is 1.2 m, water surface is 40-80 cm above fertilized eggs, no direct light source, water temperature is 18-22° C., water pH is 6.8-7.5, dissolved oxygen of water is 7.0-8.0 mg/L.

In some embodiments, during incubation, sterilizing the fertilized eggs in potassium permanganate solution for 15 min per day for 5 days, the fry is incubated on the 6th day and the incubation ends on the 9th day.

In some embodiments, feeding the fry with feed 7 days after breaking the membrane.

In some embodiments, feeding pulpous feed SCF1 from the 1st day to the 7th day of feeding, 4 times per day with the feeding amount of 8-10 mL/m², wherein the pulpous feed SCF1 is a mixture of boiled egg yolk, shrimp, multi-vitamin tablets and water, with a mass ratio of 300:20:10:750;

feeding feed SCF2 and rotifer from the 8th to 20th day, 3 times per day, the feeding amount of rotifer each time is 1.5 million/m², wherein the feed SCF2 is a mixture of boiled egg yolk, shrimp, freshly ground soybean milk, multi-vitamin tablets and water, with a mass ratio of 250:20:250:10:750;

feeding feed SCF3 from the 21st to 60th day, twice a day, the feeding amount is 10-12 g/m², wherein the feed SCF3 is a mixture of freshly ground soybean milk, shrimp, mash feed containing 28% crude protein, vitamin D3 calcium tablets, multi-vitamin tablets and water, with a mass ratio of 250:10:250:10:750;

after feeding for 60 days, feeding pellet feed used for parent fish culture, and the feeding amount is according to the feed coefficient of 3%-4%, and each feed is consumed within 15-30 min.

In some embodiments, the water quality is regulated by adding nitrifying bacteria in an amount of 15-17 g/m² every day during the fry rearing period.

In some embodiments, each feeding amount of the pellet feed is added according to the feed coefficient of 3%-4%;

the pellet feed is a mixture of mash feed containing 30%-35% crude protein, vitamin D3 calcium tablets, multi-vitamin tablets and water, with a mass ratio of 250-280:10-20:8-20:300;

after artificial insemination, rinsing the sperm-egg mixture with normal saline with osmotic pressure of 280-320 mOsm/L and temperature of 18-22° C. for 3-4 times, then splashing the sperm-egg mixture on the palmsheet, and incubating the palmsheet adhered with fertilized eggs in the incubating pond;

the incubating parameters of the incubating pond are as follows: water level is 1.2 m, water surface is 40-80 cm above fertilized eggs, no direct light source, water temperature is 18-22° C., water pH is 6.8-7.5, dissolved oxygen of water is 7.0-8.0 mg/L; during incubation, sterilizing the fertilized eggs in potassium permanganate solution for 15 min per day for 5 days, the fry is incubated on the 6th day and the incubation ends on the 9th day.

The present disclosure provides a hybridization method of *S. grahami* and carp. The present disclosure carries out parent fish culture for parent fish of *S. grahami* and carp in culture ponds, strictly controls the environmental parameters during the culture process and the types of artificial pellet feed for feeding, simulates good living conditions for *S. grahami* and carp, which is beneficial to wild *S. grahami* and wild carp to adapt to artificial culture conditions more quickly under the stimulation of various conditions, and can promote the sexual maturity of parent fish to realize natural spermatogenesis and oviposition in artificial environment at the same time, thus providing eggs and sperm with good quality and quantity for subsequent artificial hybridization. Meanwhile, during artificial insemination, the sperm-egg mixture is gently rinsed by water with osmotic pressure of 280-320 mosm/L and temperature of 18-22° C. and is then adhered to the palmsheet, so that the fertilized eggs are in an attached state when hatching, thus simulating the natural survival state. Also, the key parameters (including water level depth, water temperature, water flow velocity, pH, dissolved oxygen and sterilization of fertilized eggs, etc.) when the fertilized eggs adhered to the palmsheet incubate in the incubating pond are defined, which provides suitable environmental conditions for the smooth incubation of fertilized eggs. Three steps of parent fish cultivation, artificial insemination and artificial incubation jointly interfere with the hybridization process of *S. grahami* and carp, break the reproductive isolation of species at family level, and creatively cultivate hybrid fish species with advantages of both parents, i.e., obtain a new hybrid variety with better meat quality than carp, faster growth speed than *S. grahami*, high yield and convenience for artificial scale breeding.

Meanwhile, in the breeding process of parent fish, the present disclosure simulates the living environments of two kinds of fish respectively, and realizes the effect of natural spermatogenesis and oviposition only under the artificial environment condition without using oxytocin. Therefore, the method provided by the present disclosure reduces the production cost and makes the operation simpler and easier.

Furthermore, the present disclosure specifically defines the rhythmic adjustment of respective parameters and feed types of parent fish cultivation, which is conducive to more finely simulating the natural environment, reducing the stress of wild fish on the artificial environment, facilitating its adaptability to the artificial environment, avoiding the disorders in fish growth and reproduction caused by environmental changes, and making the quantity and quality of spermatogenesis and oviposition better.

Furthermore, the present disclosure specifically defines the rhythmic adjustment of feed type, feeding method and feeding amount according to different feeding stages of the fry, and the method is set according to the characteristics of different fry in different growth periods, which is conducive to the rapid growth of fry, while improving the survival rate of fry and reducing the deformity rate of fry.

DETAILED DESCRIPTION OF THE EMBODIMENTS

The present disclosure provides a hybridization method of *S. grahami* and carp, which comprises the steps of parent fish cultivation, artificial insemination, fish egg incubating, fry feeding and the like.

In some embodiments, *S. grahami* and carp are respectively placed in culture ponds for parent fish culture. According to the present disclosure, the sources of the *S. grahami* and carp are wild *S. grahami* and carp. According to the present disclosure, the fishing sites of the wild-type *S. grahami* and carp are not specifically limited, and the two fishes can be caught in the wild living areas well known in the art. According to the present disclosure, the varieties of *S. grahami* and carp are not specifically limited, and the common varieties of *S. grahami* and carp can be adopted. In the examples of the present disclosure, the parent fish of the *S. grahami* is a new aquatic product, the *S. grahami* "Bayou No. 1", and the parent fish of carp was collected in the Jinsha River water system in the Dianchi watershed of Kunming City, Yunnan Province.

In some embodiments, the environmental parameters of parent fish culture of the *S. grahami* are as follows: water temperature is 15-22° C., water flow velocity is 5-20 cm/s, dissolved oxygen of water is 6.0-8.5 mg/L, and water pH is 7.0-7.6. The environmental parameters of parent fish culture of the *S. grahami* are preferably adjusted rhythmically: in Stage 1 (4 months), the water temperature is 15-20° C., the water flow velocity is 10-20 cm/s, the dissolved oxygen of water is 7.0-8.0 mg/L, and the water pH is 7.0-7.6; in Stage 2 (4 months), the water temperature is 18-22° C., the water flow velocity is 5-15 cm/s, the dissolved oxygen of water is 7.0-8.5 mg/L, and the water pH is 7.2-7.4; in Stage 3 (4 months), the water temperature is 15-20° C., the water flow velocity is 5-15 cm/s, the dissolved oxygen of water is 6.0-7.0 mg/L, and the water pH is 7.0-7.6.

In some embodiments, the environmental parameters of carp parent fish culture are as follows: photoperiod is 9-12 h, water temperature is 16-25° C., water flow velocity is 25-50 m/min, water transparency is 90-95 cm, dissolved oxygen of water is 6.5-8.5 mg/L, and water pH is 6.8-7.2. The environmental parameters of carp parent fish culture are preferably adjusted rhythmically: in Stage 1' (5 months), the photoperiod is 9-10 h, the water temperature is 16-20° C., the water flow velocity is 30-50 m/min, the water transparency is 90-95 cm, the dissolved oxygen of water is 6.5-7.5 mg/L, and the water pH is 6.8-7.2; in Stage 2' (4 months), the photoperiod is 11-12 h, the water temperature is 18-25° C., the water flow velocity is 25-40 m/min, the water transparency is 90-95 cm, the dissolved oxygen of water is 7.0-8.5 mg/L, and the water pH is 7.0-7.2; in Stage 3'(3 months), the photoperiod is 11-12 h, the water temperature is 18-25° C., the water flow velocity is 40-45 m/min, the transparency of water quality is 90-95 cm, the dissolved oxygen of water is 7.0-7.5 mg/L, and the water pH is 6.8-7.2. The culture conditions of parent fish are determined according to the biological characteristics of *S. grahami* and carp, and their reproductive characteristics are different, for example, *S. grahami* lays eggs in winter and spring, while carp lays eggs in spring and summer, and other details are designed based on this.

In some embodiments, during the parent fish culture of the *S. grahami* and carp, pellet feed is fed twice a day, and each feeding amount is added according to the feed coefficient of 3%-4%, wherein the pellet feed comprises a mixture of mash feed containing 30%-35% crude protein, vitamin D3 calcium tablets, multi-vitamin tablets and water, with a mass ratio of 250-280:10-20:8-20:300. Because the protein absorption capacity of parent fish in different stages is different, and the higher crude protein content, the higher the cost, so the cost is controlled as much as possible while meeting the demand During the parent fish culture of *S. grahami* and carp, the pellet feed is preferably adjusted rhythmically according to the following requirements: in Stage 1 or Stage 1', the feed SGF1 is fed, wherein the feed SGF1 is a mixture of mash feed containing 30% crude protein, shrimp, vitamin D3 calcium tablets, multi-vitamin tablets and water, with a mass ratio of 250:20:10:8:300; winter is the key time node for gonad development, and shrimp is not added in other stages to reduce the cost; in Stage 2 or Stage 2', the feed SGF2 is fed, wherein the feed SGF2 is a mixture of mash feed containing 35% crude protein, vitamin D3 calcium tablets, multi-vitamin tablets and water, with a mass ratio of 280:20:10:300; in Stage 3 or Stage 3', the feed SGF3 is fed, wherein the feed SGF3 is a mixture of mash feed containing 32% crude protein, vitamin D3 calcium tablets, vitamin C and water, with a mass ratio of 250:20:20:300. Different stages correspond to different stages of gonad development, and the required nutrition is different. Under normal circumstances, fish are sexually mature at the age of two, and after sexual maturity, they lay eggs once a year.

After breeding the parent fish, the parent fish of *S. grahami* and carp with mature gonads are fished out to take out their sperm and eggs are taken out for artificial insemination. Parent fish of *S. grahami* and carp with mature gonads are as follows: neither female nor male parent fish has pearl star, and there is no obvious roughness when touched by hand, but the appearance of female fish is round due to the swelling of the belly with eggs, and sperm or eggs will flow out when the abdomen of the parent fish is lightly pressed. The method for collecting eggs and sperm is preferably as follows: wiping off excess water on the fish body, holding the back of the fish body with one hand, gently pushing the belly of the fish body along the outline of ovary and testis with one hand to squeeze out eggs and semen. Squeezed fish eggs and semen are placed in clean containers. The artificial insemination preferably comprises *S. grahami* as female parent×carp as male parent and *S. grahami* as male parent×carp as female parent. In the artificial insemination, eggs and sperm are mixed and stirred gently with feathers for 30 s to ensure full mixing. In the artificial insemination, the ratio of the number of eggs to sperm is preferably 1-3: $1\text{-}10\times10^5$, more preferably $1\text{:}5\times10^5$.

After artificial insemination, the sperm-egg mixture is rinsed with normal saline with osmotic pressure of 280-320 mOsm/L and temperature of 18-22° C. for 3-4 times, and then the sperm-egg mixture is splashed on palmsheet. The function of rinsing sperm-egg mixture with normal saline is to wash away the impurities such as urine and excrement, which are inevitably mixed in the process of collecting sperm-eggs, so as to avoid contaminating fertilized eggs.

Incubating palmsheet adhered with fertilized eggs in an incubating pond, wherein the incubation parameters of the incubating pond are as follows: water level is 1.2 m, water surface is 40-80 cm above fertilized eggs, no direct light source, water temperature is 18-22° C., pH is 6.8-7.5, dissolved oxygen of water is 7.0-8.0 mg/L; during incubation, the fertilized eggs are sterilized in potassium permanganate solution for 15 min every day for 5 days. The fry incubates on the 6th day and the incubation ends on the 9th day. The water surface is preferably 50-70 cm, more preferably 60 cm above the fertilized eggs, so as to ensure that the fertilized egg does not deposit and the sufficient dissolved oxygen of water. For the method without direct light source, it is preferred to set a black shading net above the incubating pond. The concentration of the potassium permanganate solution is preferably 100 ppm. The sterilization means minimizing the influence on fertilized eggs and ensuring the survival rate of embryos on the premise of sterilization. Experiments show that when incubation is not carried out under the above incubation conditions, the incubation rate is low, the survival rate is low and the deformity rate is high.

The incubated fry are fed to obtain the hybrid variety of *S. grahami* and carp.

In some embodiments, the fry is preferably fed with feed 7 days after breaking the membrane:

feeding pulpous feed SCF1 from the first day to the 7th day of feeding, 4 times per day, with the feeding amount of 8-10 mL/m² each time, wherein the pulpous feed SCF1 is a mixture of boiled egg yolk, shrimp, multi-vitamin tablets and water, with a mass ratio of 300:20:10:750;

feeding feed SCF2 and rotifer from the 8th to 20th day, 3 times per day, the feeding amount of rotifer each time is 1.5 million/m², wherein the feed SCF2 is a mixture of boiled egg yolk, shrimp, freshly ground soybean milk, multi-vitamin tablets and water, with a mass ratio of 250:20:250:10:750;

feeding feed SCF3 from the 21st to 60th day, twice a day, the feeding amount is 10-12 g/m², wherein the feed SCF3 is a mixture of freshly ground soybean milk, shrimp, mash feed containing 28% crude protein, vitamin D3 calcium tablets, multi-vitamin tablets and water, with a mass ratio of 250:10:250:10:750;

after feeding for 60 days, feeding pellet feed used for parent fish culture, and the feeding amount is according to the feed coefficient of 3%-4%, and the feed is consumed within 15-30 min.

Generally, the feed for young fish is egg yolk and soybean milk. In some embodiments, shrimp and multi-vitamin tablets are newly added, because the fish is carnivorous, so the shrimp, which is high in protein, is added, and the multi-vitamin tablets can improve immunity.

In some embodiments, it is preferable to add nitrifying bacteria in an amount of 15-17 g/m² every day to regulate the water quality during fry rearing. The addition amount of nitrifying bacteria is preferably 16 g/m². In some embodiments, the sources of nitrifying bacteria are not specifically limited, and the sources of nitrifying bacteria well known in the art can be used.

The hybridization method of *S. grahami* and carp provided by the present disclosure will be described clearly and completely in combination with the examples in the disclosure, but they should not be understood as limiting the protection scope of the present disclosure.

Example 1

1. Building a Breeding System

Breeding System of *Sinocyclocheilus grahami*;

Parent fish culture pond was established, the parameters of light, water temperature, water flow intensity and water quality in the culture pond could be rhythmically regulated, that is, in Stage 1 (4 months), the temperature was controlled at 16° C., the flow rate was controlled at 18 cm/s, the dissolved oxygen of water was controlled at 7.0 mg/L, and the pH was controlled at 7.5; in Stage 2 (4 months), the temperature was controlled at 20° C., the flow rate was controlled at 8 cm/s, the dissolved oxygen of water was controlled at 7.5 mg/L and the pH was controlled at 7.2; in Stage 3 (4 months), the temperature was controlled at 15° C., the flow rate was controlled at 10 cm/s, the dissolved oxygen of water was controlled at 6.5 mg/L, and the pH was controlled at 7.2.

Carp Breeding System:

Parent fish culture pond was established, the parameters of light, water temperature, water flow intensity and water quality in the culture pond could be rhythmically regulated, that is, in Stage 1' (5 months), the photoperiod was controlled at 9 h, the temperature was controlled at 18° C., the flow rate was controlled at 35 m/min, the water transparency was controlled at 90 cm, the dissolved oxygen of water was controlled at 6.5 mg/L, and the pH was controlled at 6.8; in Stage 2' (4 months), the photoperiod was controlled at 11 h, the temperature was controlled at 23° C., the flow rate was controlled at 35 m/min, the water transparency was controlled at 93 cm, the dissolved oxygen of water was controlled at 8.0 mg/L, and the pH was controlled at 7.0; in Stage 3' (3 months), the photoperiod was controlled at 11 h, the temperature was controlled at 23° C., the flow rate was controlled at 40 m/min, the transparency of water quality was controlled at 90 cm, the dissolved oxygen of water was controlled at 7.0 mg/L, and the pH was controlled at 6.8.

2. Preparation of Feed

SGF1 feed: mash feed containing 30% crude protein, shrimp, vitamin D3 calcium tablets, multi-vitamin tablets and water; mash feed containing 30% crude protein:shrimp:vitamin D3 calcium tablets:multi-vitamin tablets:water=250:20:10:8:300 (mass ratio).

SGF2 feed: mash feed containing 35% crude protein, vitamin D3 calcium tablets, multi-vitamin tablets and water; mash feed containing 35% crude protein:vitamin D3 calcium tablets:multi-vitamin tablets:water=280:20:10:300 (mass ratio).

SGF3 feed: mash feed containing 32% crude protein, vitamin D3 calcium tablets, vitamin C and water; mash feed containing 32% crude protein:vitamin D3 calcium tablets:vitamin C:water=250:20:20:300 (mass ratio).

SCF1 feed: boiled egg yolk, shrimp, multi-vitamin tablets and water; cooked egg yolk:shrimp:multi-vitamin tablets:water=300:20:10:750 (mass ratio).

SCF2 feed: boiled egg yolk, shrimp, freshly ground soybean milk, multi-vitamin tablets and water; boiled egg yolk:shrimp:freshly ground soybean milk:multi-vitamin tablets:water=250:20:250:10:750 (mass ratio).

SCF3 feed: freshly ground soybean milk, shrimp, mash feed containing 28% crude protein, vitamin D3 calcium tablets, multi-vitamin tablets and water; freshly ground soybean milk:shrimp:mash feed containing 28% crude protein:vitamin D3 calcium tablets:multi-vitamin tablets:water=250:10:250:10:750 (mass ratio).

3. Source of Parent Fish

The parent fish of *S. grahami* was a new aquatic product, i.e. "Bayou No. 1". The parent fish of carp was collected in the Jinsha River water system in the Dianchi watershed of Kunming City, Yunnan Province in 2012, all of which were caught by three layers hanging nets, with a total of 112 fish. After sampling inspection, the average length of carp was 22.6 cm, and the average weight was 0.486 kg. Parent fish were packed into plastic fry bags with a length of 80 cm and a width of 50 cm, which were flushed with oxygen and brought back to the breeding base, and the weight of each bag of fish was 4.5-5 kg.

4. Domestication of Parent Fish

The domestication pond with a length of 8 m, a width of 5 m and a height of 3 m was emptied in advance and exposed to the sun for 3 days, then the wall of the pond was cleaned with a long brush, the pond was soaked with potassium permanganate for 1 day, and then washed with clear water for 3 times, each time for 30 minutes. Parent fish were put into domestication pond after disinfection. The pond was covered with black shading net. The water level in the pond and the height of drainage channel outside the pond were both 1.5 m, the velocity of inlet pipe was 45 cm/s, and the transparency of water quality was 100 cm. Oxygen supply equipment was installed in the pond, with dissolved oxygen of water was 5.5 mg/L, pH was 6.8, osmotic pressure was 3.0 mOsm/L and temperature was 16-22° C. Artificial pellet feed was fed at 10:00 and 16:00 every day. After 5 days of domestication, 5 carp parents died in total.

5. Intensive Cultivation of Parent Fish

At 9:00 on Mar. 16, 2019, the male and female parent fish of *S. grahami* and carp with normal morphology, good growth and disease-free were respectively placed in the culture pond, and the self-made pellet feed was fed twice a day. The feeding amount was according to the feed coefficient of 3%-4%. The feed formula was adjusted rhythmically according to the requirements, that is, in Stage 1 or Stage 1', the feed SGF1 was fed; in Stage 2 or Stage 2', the feed SGF2 was fed; in Stage 3 or Stage 3', the feed SGF3 was fed.

The breeding system constructed in the culture pond simulates good living conditions for carp. Stimulation of various conditions was beneficial for wild carp to adapt to artificial culture conditions more quickly, and at the same time, it could promote the sexual maturity of parent fish to lay eggs. During the reproductive season, neither the female nor the male has pearl star, and there was no obvious roughness when touched by hand, but the appearance of female fish was round due to the swelling of the belly with eggs, and sperm or eggs would flow out when the abdomen of the parent fish was lightly pressed.

6. Artificial Insemination

At 16:00 on May 18, the male and female parent fish of *S. grahami* and carp with normal morphology, disease-free and good gonad development were selected as female parent and male parent respectively, that is, *S. grahami* and carp were used as female parent for artificial insemination. Excess water on the fish body was wiped off, the back of the fish body was held with one hand, the belly of the fish body was gently pushed along the outline of ovary and testis with another hand to squeeze out eggs and semen. Squeezed fish eggs and semen were placed in clean containers, and immediately stirred gently with chicken feathers for 30 s. Then, the sperm-egg mixture was rinsed gently with water with osmotic pressure of 280 mOsm/L and temperature of 18° C., when rinsing, the fish-egg semen mixture was stirred gently clockwise with chicken feathers to remove excess semen. After rinsing for 3 times, the fish-egg semen mixture was evenly splashed on the sterilized and washed palmsheet.

7. Incubation of Fish Eggs

The palmsheet adhered with fertilized eggs were placed in a sterilized and washed incubating pond (5 m×4 m×1.5 m) with a water level of 1.2 m, water surface 50 cm above the eggs, no direct light source, a water temperature of 20° C., a pH of 7.2 and a dissolved oxygen of water of 7.5 mg/L; every day, the eggs were sterilized in 100 ppm potassium permanganate solution for 15 min for 5 days. The fries incubated on the 6th day, and the incubation ended on the 9th day.

8. Breeding of Fries

The fries were fed 7 days after breaking the membrane, and the water quality was regulated by adding nutrifying bacteria at 15 g/m² every day. Different feeds were fed according to stages, wherein, in the fry rearing stage:

From the 1st to 7th day of the feeding period, SCF1 was fed 4 times per day, and the feeding amount was 8 mL/m².

From the 8th to 20th day, the feed SCF2 and rotifer were fed three times per day, and the feeding amount of rotifer was 1.5 million/m².

From the 21st to 60th day, the feed SCF3 was fed with the feeding amount of 10 g/m².

After 60 days of feeding, the fries were fed with feed used for parent fish culture, and the feeding amount was according to the feed coefficient of 4%, and the feed was consumed within 20 min.

Example 2

1. Building a Breeding System

Breeding System of *S. grahami*;

Parent fish culture pond was established, the parameters of light, water temperature, water flow intensity and water quality in the culture pond could be rhythmically regulated, that is, in Stage 1 (4 months), the temperature was controlled at 18° C., the flow rate was controlled at 20 cm/s, the dissolved oxygen of water was controlled at 7.8 mg/L, and the pH was controlled at 7.5; in Stage 2 (4 months), the temperature was controlled at 20° C., the flow rate was controlled at 12 cm/s, the dissolved oxygen of water was controlled at 8.2 mg/L and the pH was controlled at 7.0; in Stage 3 (4 months), the temperature was controlled at 20° C., the flow rate was controlled at 12 cm/s, the dissolved oxygen of water was controlled at 6.8 mg/L, and the pH was controlled at 7.4.

Carp Breeding System:

Parent fish culture pond was established, the parameters of light, water temperature, water flow intensity and water quality in the culture pond could be rhythmically regulated, that is, in Stage 1' (5 months), the photoperiod was controlled at 10 h, the temperature was controlled at 18° C., the flow rate was controlled at 45 m/min, the water transparency was controlled at 95 cm, the dissolved oxygen of water was controlled at 7.5 mg/L, and the pH was controlled at 7.2; in Stage 2' (4 months), the photoperiod was controlled at 12 h, the temperature was controlled at 25° C., the flow rate was controlled at 45 m/min, the water transparency was controlled at 95 cm, the dissolved oxygen of water was controlled at 8.5 mg/L, and the pH was controlled at 7.2; in Stage 3' (3 months), the photoperiod was controlled at 12 h, the temperature was controlled at 25° C., the flow rate was controlled at 45 m/min, the transparency of water quality was controlled at 95 cm, the dissolved oxygen of water was controlled at 7.5 mg/L, and the pH was controlled at 6.8-7.2.

2. Preparation of Feed

SGF1 feed: mash feed containing 30% crude protein, shrimp, vitamin D3 calcium tablets, multi-vitamin tablets and water; mash feed containing 30% crude protein:shrimp:vitamin D3 calcium tablets:multi-vitamin tablets:water=250:20:10:8:300 (mass ratio).

SGF2 feed: mash feed containing 35% crude protein, vitamin D3 calcium tablets, multi-vitamin tablets and water; mash feed containing 35% crude protein:vitamin D3 calcium tablets:multi-vitamin tablets:water=280:20:10:300 (mass ratio).

SGF3 feed: mash feed containing 32% crude protein, vitamin D3 calcium tablets, vitamin C and water; mash feed containing 32% crude protein:vitamin D3 calcium tablets: vitamin C:water=250:20:20:300 (mass ratio).

SCF1 feed: boiled egg yolk, shrimp, multi-vitamin tablets and water; boiled egg yolk:shrimp:multi-vitamin tablets: water=300:20:10:750 (mass ratio).

SCF2 feed:boiled egg yolk, shrimp, freshly ground soybean milk, multi-vitamin tablets and water; boiled egg yolk:shrimp:freshly ground soybean milk:multi-vitamin tablets:water=250:20:250:10:750 (mass ratio).

SCF3 feed: freshly ground soybean milk, shrimp, mash feed containing 28% crude protein, vitamin D3 calcium tablets, multi-vitamin tablets and water; freshly ground soybean milk:shrimp:mash feed containing 28% crude protein:vitamin D3 calcium tablets:multi-vitamin tablets:water=250:10:250:10:750 (mass ratio).

3. Source of Parent Fish

The parent fish of S. grahami was a new aquatic product, i.e. "Bayou No. 1". The parent fish of carp was collected in the Jinsha River water system in the Dianchi watershed of Kunming City, Yunnan Province in 2012, all of which were caught by three layers hanging nets, with a total of 112 fish. After sampling inspection, the average length of carp was 22.6 cm, and the average weight was 0.486 kg. Parent fish were packed into plastic fry bags with a length of 80 cm and a width of 50 cm, which were flushed with oxygen and brought back to the breeding base, and the weight of each bag of fish was 4.5-5 kg.

4. Domestication of Parent Fish

The domestication pond with a length of 8 m, a width of 5 m and a height of 3 m was emptied in advance and exposed to the sun for 3 days, then the wall of the pond was cleaned with a long brush, the pond was soaked with potassium permanganate for 1 day, and then washed with clear water for 3 times, each time for 40 minutes. Parent fish were put into domestication pond after disinfection. The pond was covered with black shading net. The water level in the pond and the height of drainage channel outside the pond were both 1.5 m, the velocity of inlet pipe was 50 cm/s, and the transparency of water quality was 105 cm. Oxygen supply equipment was installed in the pond, with dissolved oxygen of water was 7.0 mg/L, pH was 7.2, osmotic pressure was 4.5 mOsm/L and temperature was 16-22° C. Artificial pellet feed was fed at 10:00 and 16:00 every day. After 5 days of domestication, 5 carp parents died in total.

5. Intensive Cultivation of Parent Fish

At 9:00 on Mar. 16, 2019, the male and female parent fish of S. grahami and carp with normal morphology, good growth and disease-free were respectively placed in the culture pond, and the self-made pellet feed was fed twice a day. The feeding amount was according to the feed coefficient of 4%. The feed formula was adjusted rhythmically according to the requirements, that is, in Stage 1 or Stage 1', the feed SGF1 was fed; in Stage 2 or Stage 2', the feed SGF2 was fed; in Stage 3 or Stage 3', the feed SGF3 was fed.

The breeding system constructed in the culture pond simulates good living conditions for carp. Stimulation of various conditions was beneficial for wild carp to adapt to artificial culture conditions more quickly, and at the same time, it could promote the sexual maturity of parent fish to lay eggs. During the reproductive season, neither the female nor the male has pearl star, and there was no obvious roughness when touched by hand, but the appearance of female fish was round due to the swelling of the belly with eggs, and sperm or eggs would flow out when the abdomen of the parent fish was lightly pressed.

6. Artificial Insemination

At 16:00 on May 18, the male and female parent fish of S. grahami and carp with normal morphology, disease-free and good gonad development were selected as female parent and male parent respectively, that is, S. grahami and carp were used as female parent for artificial insemination. Excess water on the fish body was wiped off, the back of the fish body was held with one hand, the belly of the fish body was gently pushed along the outline of ovary and testis with another hand to squeeze out eggs and semen. Squeezed fish eggs and semen were placed in clean containers, and immediately stirred gently with chicken feathers for 30 s. Then, the sperm-egg mixture was rinsed gently with water with osmotic pressure of 320 mOsm/L and temperature of 22° C., when rinsing, the fish-egg semen mixture was stirred gently clockwise with chicken feathers to remove excess semen. After rinsing for 3 times, the fish-egg semen mixture was evenly splashed on the sterilized and washed palmsheet.

7. Incubation of Fish Eggs

The palmsheet adhered with fertilized eggs were placed in a sterilized and washed incubating pond (5 m×4 m×1.5 m) with a water level of 1.2 m, water surface 70 cm above the eggs, no direct light source, a water temperature of 20° C., a pH of 7.5 and a dissolved oxygen of water of 7.0-8.0 mg/L; every day, the eggs were sterilized in 100 ppm potassium permanganate solution for 15 min for 5 days. The fries incubated on the 6th day, and the incubation ended on the 9th day.

8. Breeding of Fries

The fries were fed 7 days after breaking the membrane, and the water quality was regulated by adding nutrifying bacteria at 17 g/m$^2$ every day. Different feeds were fed according to stages, wherein, in the fry rearing stage:

From the 1st to 7th day of the feeding period, SCF1 was fed 4 times per day, and the feeding amount was 10 mL/m$^2$.

From the 8th to 20th day, the feed SCF2 and rotifer were fed three times per day, and the feeding amount of rotifer was 1.5 million/m$^2$.

From the 21st to 60th day, the feed SCF3 was fed with the feeding amount of 12 g/m$^2$.

After 60 days of feeding, the fries were fed with feed used for parent fish culture, and the feeding amount was according to the feed coefficient of 4%, and the feed was consumed within 25 min.

The eggs and sperm collected from the male and female parents fish in Examples 1-2 were tested for quality, wherein the nuclear deviation rate was the percentage of the number of fish eggs with nuclear deviation to the total number of fish eggs tested after the fish eggs were placed in 10% acetic acid solution. Sperm motility was the percentage of the number of motile sperm to the total number of sperm measured after semen activation. The egg nucleus deviation rate of S. grahami was 93%, sperm motility of S. grahami was 95%, egg nucleus deviation rate of S. grahami was 90% and sperm motility of S. grahami was 90%. At the same time, according to the growth and development of different cultivation stages, the fertilization rate, incubating rate, seedling survival rate and deformity rate were counted respectively. The results were shown in Table 1.

TABLE 1

Cultivation Results of Two Hybridization Methods of Examples 1-2

| Groups | Hybridization Method | Fertilization Rate | Incubating Rate | Seedling Survival Rate | Deformity Rate |
|---|---|---|---|---|---|
| Example 1 | carp♀ × S. grahami♂ | 90% | 92% | 96% | 0.6% |
| Example 2 | S. grahami♀ × carp♂ | 95% | 90% | 95% | 1% |

Comparative Example 1

Without the above-mentioned breeding system, the key problem was that the spawning seasons of S. grahami and common carp were different. The spawning seasons of S. grahami were from January to April, while that of carp was from May to July. The spawning seasons did not overlap, and hybridization could not be carried out. Of course, without this breeding system, the sperm-egg quality of the S. grahami and carp was not good, which was mainly reflected in that the egg nucleus deviation rate of S. grahami≤80%, sperm motility≤85%, carp egg nucleus deviation rate≤85% and sperm motility≤90%.

Comparative Example 2

1. Building a Breeding System
Same as the aquaculture system of Example 1.
2. Preparation of Feed
The brood fish feed included: 111 carp brood fish feed, mash feed containing 30% crude protein, multi-vitamin tablets and water, mash feed containing 30% crude protein: multi-vitamin tablets:water=150:100:10:300 (mass ratio).
The pulpous feed included: boiled egg yolk, shrimp, freshly ground soybean milk, multi-vitamin tablets and water, boiled egg yolk:shrimp:freshly ground soybean milk: multi-vitamin tablets:water=200:20:300:10:750 (mass ratio).
3. Source of Parent Fish
Same as parent fish source in Example 1.
4. Domestication of Parent Fish
Same as domestication of parent fish in Example 1.
5. Intensive Cultivation of Parent Fish
At 09:00 on Mar. 19, 2018, the male and female parent fish of S. grahami and carp with normal morphology, good growth and disease-free were selected and placed in the culture pond, and fed with the feed of brood fish twice a day, and the feeding amount was according to the feed coefficient of 3%.
6. Artificial Insemination
Same as the artificial insemination scheme of Example 1.
7. Incubating Fish Eggs
Same as the incubating scheme of fish eggs in Example 1.
According to the above scheme, the sperm-egg quality of S. grahami and carp was not good, which was mainly reflected in the following aspects: egg nucleus deviation rate of S. grahami≤85%, sperm motility≤85%, carp egg nucleus deviation rate≤85% and sperm motility≤90%. Hybrid fertilization rate≤70%, incubating rate≤60%, fry survival rate≤40%, deformity rate≥30%.

The above described are only preferred embodiments of the present disclosure, it should be understood by those skilled in the art that, without departing from the principle of the present application, any improvements and modifications fall into the scope of the present disclosure.

What is claimed is:

1. A hybridization method of S. grahami and carp, wherein comprising the following steps:
placing the S. grahami and carp in culture ponds respectively for parent fish culture, wherein environmental parameters in culture ponds of S. grahami parent fish are as follows: water temperature is in a range of 15-22° C., water flow velocity is in a range of 5-20 cm/s, the concentration of dissolved oxygen of water is in a range of 6.0-8.5 mg/L, water pH is in a range of 7.0-7.6; environmental parameters in culture ponds of carp parent fish are as follows: photoperiod is in a range of 9-12 h, water temperature is in a range of 16-25° C., water flow velocity is in a range of 25-50 m/min, water transparency is in a range of 90-95 cm, the concentration of dissolved oxygen of water is in a range of 6.5-8.5 mg/L, water pH is in a range of 6.8-7.2;
during the parent fish culture of S. grahami and carp, feeding pellet feed twice a day;
collecting sperm and eggs from male and female S. grahami parent fish and carp parent fish with mature gonads respectively, artificially inseminating and incubating the eggs from female S. grahami parent fish and carp parent fish;
after feeding an incubated fry, obtaining a hybrid variety of S. grahami and carp.

2. The hybridization method of S. grahami and carp according to claim 1, wherein the environmental parameters of parent fish culture of S. grahami are rhythmically regulated:
in Stage 1: water temperature is 15-20° C., water flow velocity is 10-20 cm/s, dissolved oxygen of water is 7.0-8.0 mg/L, and water pH is 7.0-7.6;
in Stage 2: water temperature is in a range of 18-22° C., water flow velocity is in a range of 5-15 cm/s, the concentration of dissolved oxygen of water is in a range of 7.0-8.5 mg/L, and water pH is in a range of 7.2-7.4;
in Stage 3: water temperature is in a range of 15-20° C., water flow velocity is in a range of 5-15 cm/s, the concentration of dissolved oxygen of water is in a range of 6.0-7.0 mg/L, and water pH is in a range of 7.0-7.6.

3. The hybridization method of S. grahami and carp according to claim 1, wherein the environmental parameters of parent fish culture of carp are rhythmically regulated:
in Stage 1': photoperiod is in a range of 9-10 h, water temperature is in a range of 16-20° C., water flow velocity is in a range of 30-50 m/min, water transparency is in a range of 90-95 cm, the concentration of dissolved oxygen of water is in a range of 6.5-7.5 mg/L, and water pH is in a range of 6.8-7.2;
in Stage 2': photoperiod is in a range of 11-12 h, water temperature is in a range of 18-25° C., water flow velocity is in a range of 25-40 m/min, water transparency is in a range of 90-95 cm, the concentration of dissolved oxygen of water is in a range of 7.0-8.5 mg/L, and water pH is in a range of 7.0-7.2;
in Stage 3': photoperiod is in a range of 11-12 h, water temperature is in a range of 18-25° C., water flow velocity is in a range of 40-45 m/min, water transparency is in a range of 90-95 cm, the concentration of dissolved oxygen of water is in a range of 7.0-7.5 mg/L, and water pH is in a range of 6.8-7.2.

4. The hybridization method of S. grahami and carp according to claim 1, wherein during the parent fish culture of *S. grahami* and carp, the pellet feed is rhythmically regulated according to requirements:

feeding feed SGF1 in Stage 1 or Stage 1', wherein the feed SGF1 is a mixture of mash feed containing 30% crude protein, shrimp, vitamin D3 calcium tablets, multi-vitamin tablets and water, with a mass ratio of 250:20:10:8:300;

feeding feed SGF2 in Stage 2 or Stage 2', wherein the feed SGF2 is a mixture of mash feed containing 35% crude protein, vitamin D3 calcium tablets, multi-vitamin tablets and water, with a mass ratio of 280:20:10:300;

feeding feed SGF3 in Stage 3 or Stage 3', wherein the feed SGF3 is a mixture of mash feed containing 32% crude protein, vitamin D3 calcium tablets, vitamin C and water, with a mass ratio of 250:20:20:300.

5. The hybridization method of *S. grahami* and carp according to claim 1, wherein the artificially inseminating comprises using *S. grahami* as female parent and carp as male parent, and using *S. grahami* as male parent and carp as female parent.

6. The hybridization method of *S. grahami* and carp according to claim 1, wherein the quantity ratio of eggs to sperm is 1-3:1-10×10$^5$ during the artificial inseminating.

7. The hybridization method of *S. grahami* and carp according to claim 1, wherein the fry is fed with feed 7 days after the fry breaks an egg membrane.

8. The hybridization method of *S. grahami* and carp according to claim 7, wherein the feeding of the feed is adjusted according to different growth periods of fry:

feeding pulpous feed SCF1 from the 1st day to the 7th day of feeding, 4 times per day with the feeding amount of 8-10 mL/m$^2$, wherein the pulpous feed SCF1 is a mixture of boiled egg yolk, shrimp, multi-vitamin tablets and water, with a mass ratio of 300:20:10:750;

feeding feed SCF2 and rotifer from the 8th to 20th day, 3 times per day, the feeding amount of rotifer each time is 1.5 million/m$^2$, wherein the feed SCF2 is a mixture of boiled egg yolk, shrimp, freshly ground soybean milk, multi-vitamin tablets and water, with a mass ratio of 250:20:250:10:750;

feeding feed SCF3 from the 21st to 60th day, twice a day, the feeding amount is 10-12 g/m$^2$, wherein the feed SCF3 is a mixture of freshly ground soybean milk, shrimp, mash feed containing 28% crude protein, vitamin D3 calcium tablets, multi-vitamin tablets and water, with a mass ratio of 250:10:250:10:750;

after feeding for 60 days, feeding the pellet feed used for parent fish culture, and the feeding amount is according to the feed coefficient of 3%-4%, and the feed is consumed within 15-30 min.

9. The hybridization method of *S. grahami* and carp according to claim 8, wherein the water quality is regulated by adding nitrifying bacteria in an amount of 15-17 g/m$^2$ every day during the fry rearing period.

10. The hybridization method of *S. grahami* and carp according to claim 8, wherein each feeding amount of the pellet feed is according to the feed coefficient of 3%-4%;

the pellet feed is a mixture of mash feed containing 30%-35% crude protein, vitamin D3 calcium tablets, multi-vitamin tablets and water, with a mass ratio of 250-280:10-20:8-20:300;

after artificial inseminating, rinsing the sperm-egg mixture with normal saline with osmotic pressure of 280-320 mOsm/L and temperature of 18-22° C. for 3-4 times, then splashing the sperm-egg mixture on a palmsheet, and incubating the palmsheet adhered with fertilized eggs in incubating pond;

the incubating parameters of the incubating pond are as follows: water level is 1.2 m, water surface is in a range of 40-80 cm above fertilized eggs, no direct light source, water temperature is in a range of 18-22° C., water pH is in a range of 6.8-7.5, the concentration of dissolved oxygen of water is in a range of 7.0-8.0 mg/L; during incubation, sterilizing the fertilized eggs in potassium permanganate solution for 15 min every day for 5 days, the fry is incubated on the 6th day and the incubation ends on the 9th day.

11. The hybridization method of *S. grahami* and carp according to claim 6, wherein the artificially inseminating comprises using *S. grahami* as female parent and carp as male parent, and using *S. grahami* as male parent and carp as female parent.

* * * * *